(12) United States Patent
Faruque et al.

(10) Patent No.: US 11,577,784 B2
(45) Date of Patent: Feb. 14, 2023

(54) VEHICLE FRAME

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US); Saeed David Barbat, Novi, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 17/010,172

(22) Filed: Sep. 2, 2020

(65) Prior Publication Data
US 2022/0063727 A1 Mar. 3, 2022

(51) Int. Cl.
*B62D 21/15* (2006.01)
*B62D 21/02* (2006.01)
*B62D 21/11* (2006.01)

(52) U.S. Cl.
CPC .......... *B62D 21/152* (2013.01); *B62D 21/02* (2013.01); *B62D 21/11* (2013.01)

(58) Field of Classification Search
CPC ...... B62D 21/152; B62D 21/02; B62D 21/11; B62D 25/082; B62D 25/088
USPC .......................... 296/187.03, 187.1, 198, 30
See application file for complete search history.

(56) References Cited

U.S. PATENT DOCUMENTS

| | | | |
|---|---|---|---|
| 7,819,218 B2 | 10/2010 | Eichberger et al. | |
| 8,398,153 B1 | 3/2013 | Dandekar et al. | |
| 9,233,716 B2 | 1/2016 | Midoun et al. | |
| 9,327,763 B2 * | 5/2016 | Maier | B60R 19/00 |
| 2015/0021936 A1 * | 1/2015 | Nusier | B60R 19/14 |
| | | | 293/114 |
| 2018/0257472 A1 * | 9/2018 | Spurling | B60K 5/1216 |

FOREIGN PATENT DOCUMENTS

DE 102013015116 A1 * 3/2015 .......... B62D 21/152

* cited by examiner

*Primary Examiner* — D Glenn Dayoan
*Assistant Examiner* — E Turner Hicks
(74) *Attorney, Agent, or Firm* — Frank A. MacKenzie; Bejin Bieneman PLC

(57) ABSTRACT

A vehicle frame includes a frame rail, a shock tower bracket, and a cable. The frame rail is elongated along a vehicle-longitudinal axis. The shock tower bracket is connected to the frame rail. The cable is connected to the frame rail and the shock tower bracket. The cable extends transverse to the vehicle-longitudinal axis from the frame rail to the shock tower bracket.

21 Claims, 5 Drawing Sheets

VEHICLE FRAME

BACKGROUND

During an offset frontal impact of a vehicle, a direction of the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

During the offset frontal impact, a wheel may rotate relative to a suspension arm, e.g., about a king pin axis or a steering axis, to a position in which the wheel is oriented with a front portion of the wheel being positioned outboard relative to a rear portion of the wheel. In this position, the wheel may be trapped between a bumper beam of the vehicle, the suspension arm, and a rear of a wheel well of the vehicle. As the bumper beam moves toward the rear of the wheel well, the bumper and/or other components of the vehicle may force the wheel toward a passenger compartment of the vehicle.

DETAILED DESCRIPTION

Figure 1:
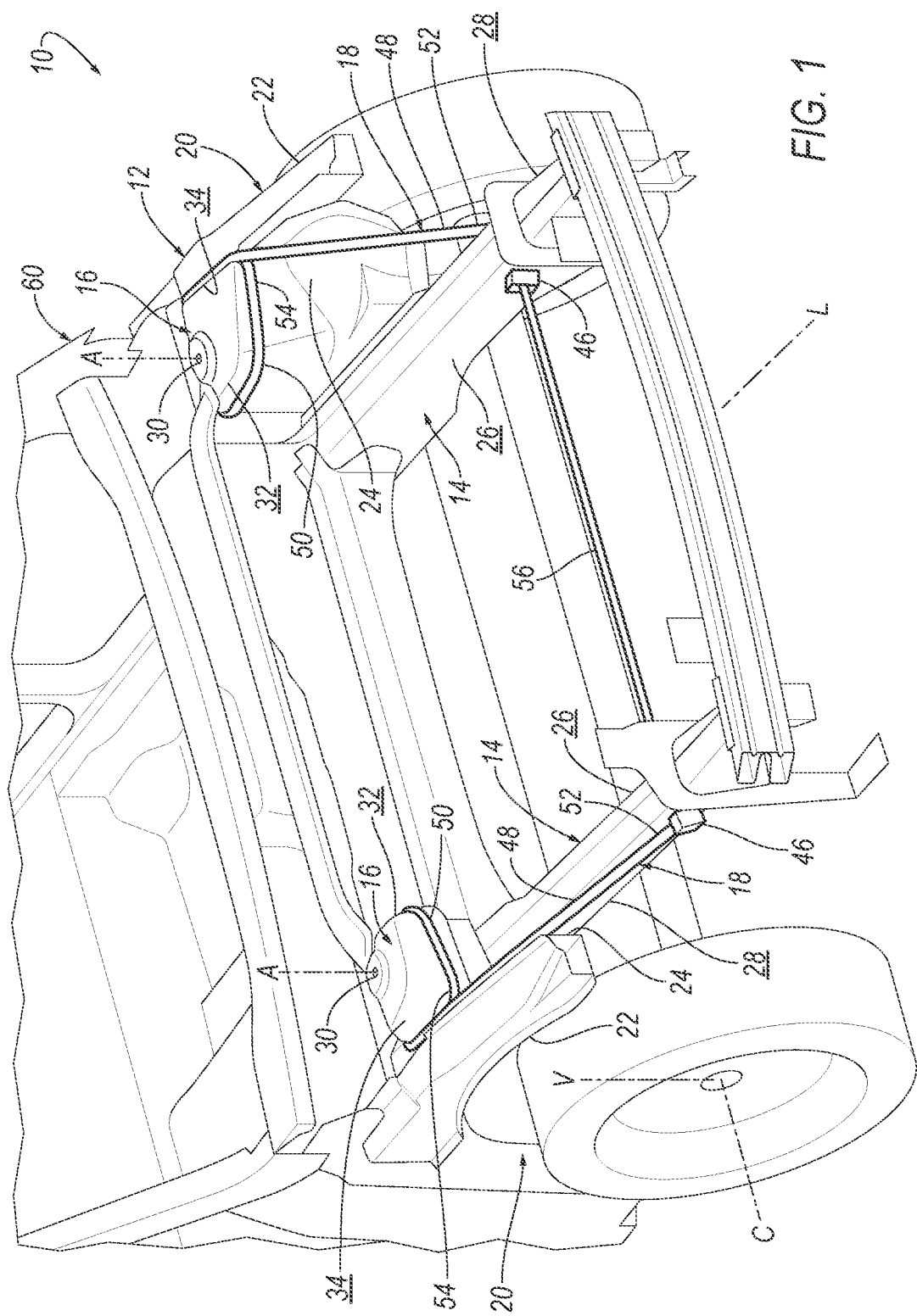
FIG. 1 is a perspective view of a vehicle frame including a cable extending from a frame rail to a shock tower bracket.

A vehicle frame includes a frame rail elongated along a vehicle-longitudinal axis. A shock tower bracket is connected to the frame rail. A cable is connected to the frame rail and the shock tower bracket. The cable extends transverse to the vehicle-longitudinal axis from the frame rail to the shock tower bracket.

The cable may be fixed relative to the frame rail and the shock tower bracket.

The shock tower bracket may partially define a wheel well, and the cable may be vehicle-forward and inboard of the wheel well at the frame rail.

The wheel well may include an inboard side and an outboard side spaced from the inboard side along a cross-vehicle axis. The cable may be above the wheel well and between the inboard side and the outboard side at the shock tower bracket.

The shock tower bracket may be disposed outboard of the frame rail along a cross-vehicle axis and may extend upwardly along a vertical axis relative to the frame rail.

The cable may extend transverse to the cross-vehicle axis and the vertical axis.

The cable may extend at least partially circumferentially around the shock tower bracket.

The shock tower bracket may include an inboard face facing the frame rail and an outboard face spaced from the inboard face along a cross-vehicle axis. The cable may extend from the frame rail to the outboard face of the shock tower bracket.

The frame rail may include an outboard face facing the shock tower bracket and an inboard face spaced from the outboard face along a cross-vehicle axis. The cable may extend through the inboard face and the outboard face and may extend from the outboard face to the shock tower bracket.

The frame rail may include an outboard face facing the shock tower bracket and an inboard face spaced from the outboard face along a cross-vehicle axis. The cable may extend from the outboard face of the frame rail to the shock tower bracket.

The cable may be under tension between the shock tower bracket and the frame rail.

The cable may be metal.

The vehicle frame may include a bracket attached to the frame rail. The cable may be threadedly engaged with the bracket.

The vehicle frame may include a channel bracket fixed to the shock tower bracket. The cable may be disposed in the channel bracket.

The channel bracket may extend at least partially circumferentially around the shock tower bracket. The cable may extend through the channel bracket.

The vehicle frame may include a second frame rail spaced from the frame rail along a cross-vehicle axis, and a second cable extending along the cross-vehicle axis from the frame rail to the second rail.

The second cable may be under tension between the frame rail and the second frame rail.

The frame rail may include an outboard face facing the shock tower bracket and an inboard face spaced from the outboard face along a cross-vehicle axis. The cable may be fixed to the outboard face and the second cable being fixed to the inboard face.

The vehicle frame may include one bracket fixed to the outboard face of the frame rail and another bracket fixed to the inboard face of the frame rail. The cable and the second cable each may be threadedly engaged with the respective bracket.

The brackets may be aligned with each other along the vehicle-longitudinal axis.

With reference to the Figures, wherein like numerals indicate like parts throughout the several views, a vehicle 10 is generally shown. The vehicle 10 includes a frame 12 having a frame rail 14 and a shock tower bracket 16 connected to the frame rail 14. The frame rail 14 is elongated along a vehicle-longitudinal axis L. A cable 18 is connected to the frame rail 14 and the shock tower bracket 16. The cable 18 extends transverse to the vehicle-longitudinal axis L from the frame rail 14 to the shock tower bracket 16.

Figure 4A:
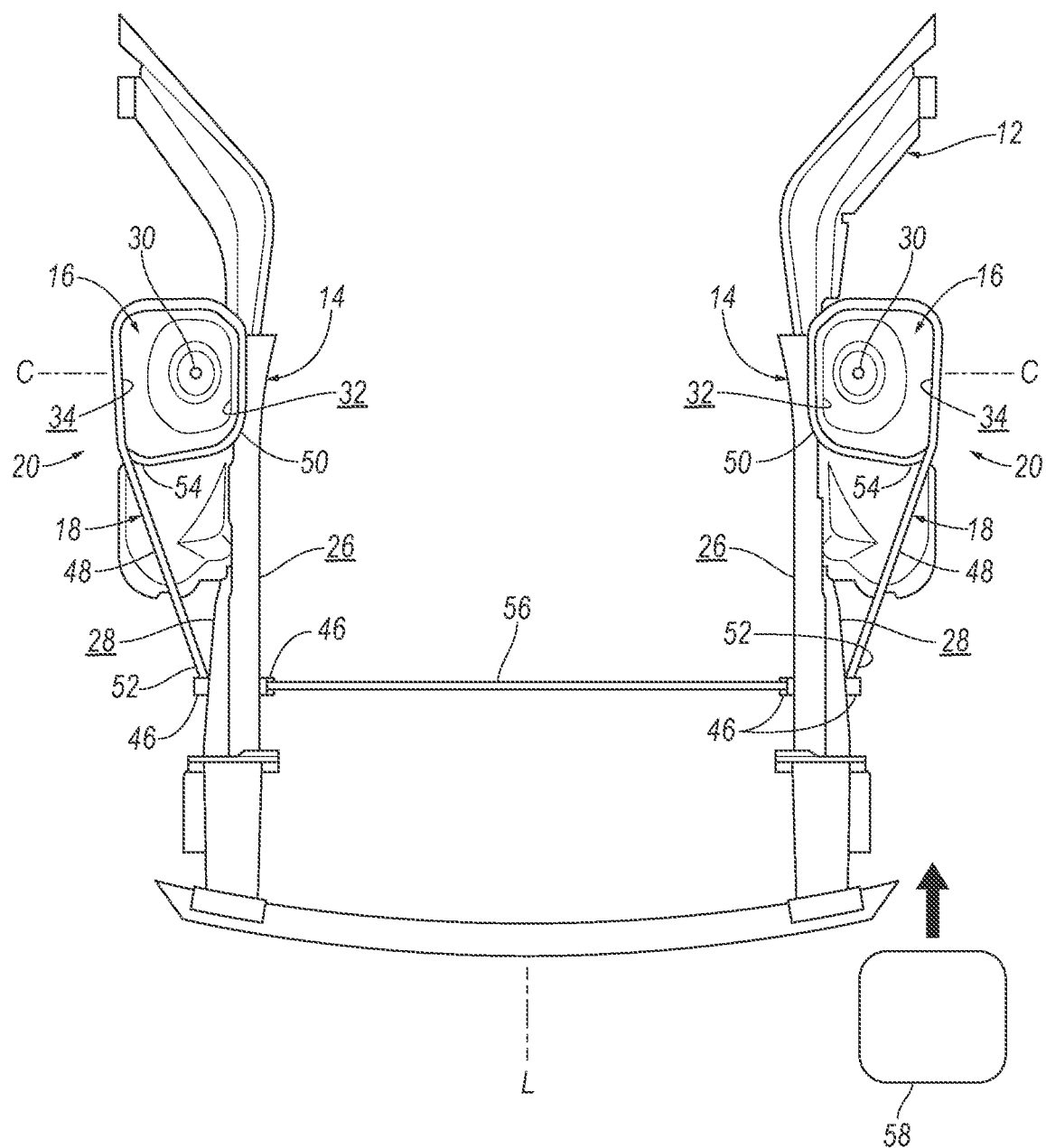
FIG. 4A is a top view of a portion of the vehicle frame at an initial stage of a SORB frontal impact test.
Figure 4B:
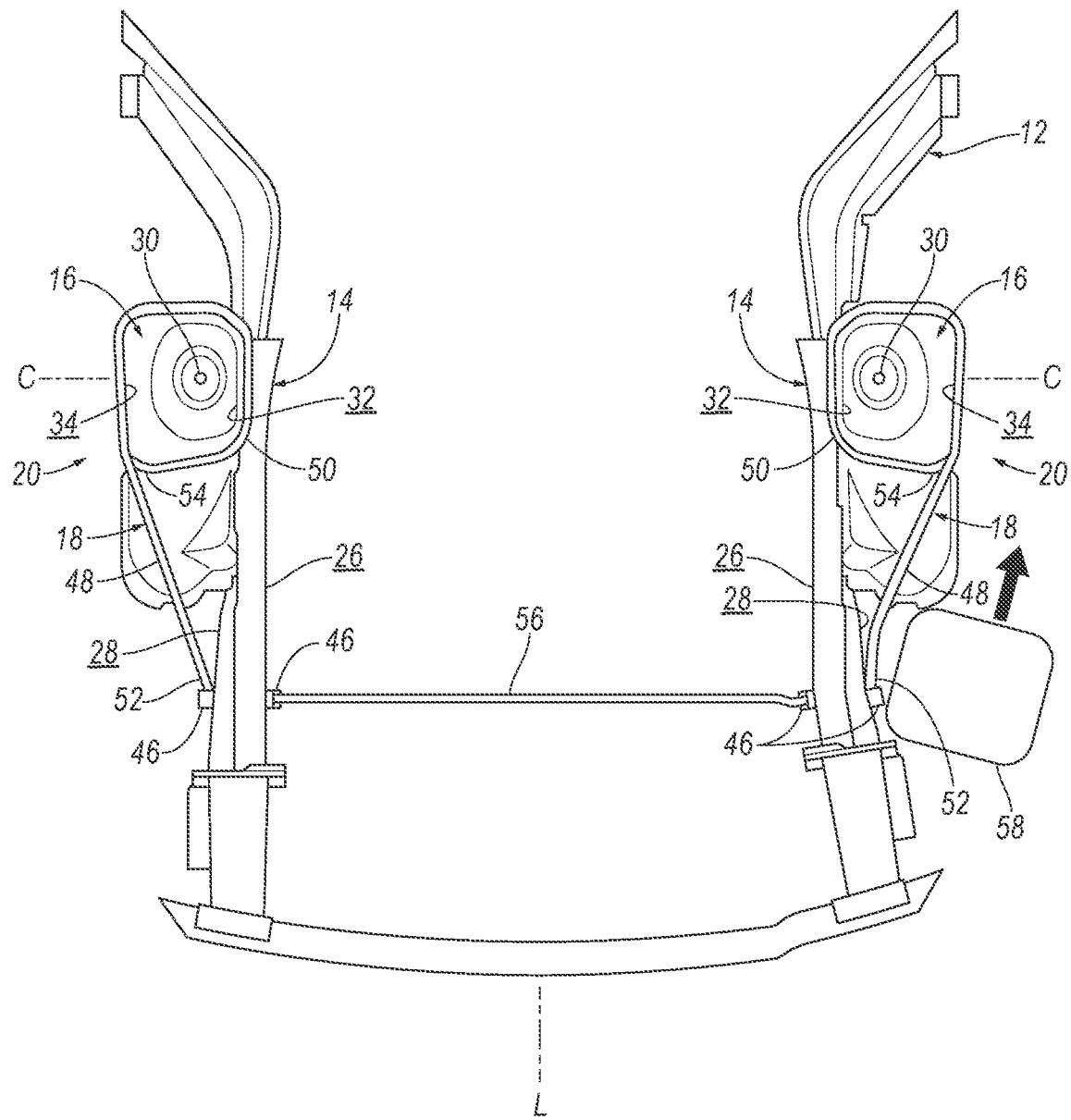
FIG. 4B is the top view of FIG. 4A at a later stage of the SORB frontal impact test.

During an impact of the vehicle 10, e.g., a small-offset-rigid barrier (SORB) frontal crash test as shown in FIGS. 4A and 4B, the cable 18 is impacted and distributes a force from a rigid barrier 58 to the frame rail 14 and the shock tower bracket 16 and deflects the rigid barrier 58 away from the vehicle 10 and/or deflects the vehicle 10 away from the rigid barrier 58. This reduces the likelihood of direct impact between the rigid barrier 58 and a wheel of the vehicle thereby reducing the likelihood of wheel intrusion into a passenger cabin of the vehicle 10 during the SORB frontal crash test. Specifically, the cable 18 remains connected to the frame rail 14 and the shock tower bracket 16 such that the cable 18 remains under tension during the SORB frontal crash test. Thus, the cable 18 directs the rigid barrier 58 of the SORB frontal crash test transverse to the vehicle-longitudinal axis L and away from the passenger cabin and/or directs the vehicle 10 transverse to the vehicle-longitudinal axis L away from the rigid barrier 58.

With reference to FIG. 1, the vehicle 10 may be any type of passenger or commercial automobile such as a car, a truck, a sport utility vehicle, a crossover, a van, a minivan, a taxi, a bus, etc.

The vehicle 10 defines the vehicle-longitudinal axis L, i.e., extending between a front and a rear of the vehicle 10. The vehicle 10 defines a cross-vehicle axis C, i.e., extending between a left side and a right side of the vehicle 10. The vehicle 10 defines a vertical axis V, i.e., extending between a top and a bottom of the vehicle 10. The vehicle-longitudinal axis L, the cross-vehicle axis C, and the vertical axis V may be perpendicular to each other.

The vehicle 10 includes a body 60. The vehicle 10 may be of a unibody construction, in which the frame 12 and the body 60 of the vehicle 10 are a single component. The vehicle 10 may, alternatively, be of a body-on-frame construction, in which the frame 12 supports the body 60 that is a separate component from the frame 12. The frame 12 and body 60 may be formed of any suitable material, for example, steel, aluminum, etc.

With continued reference to FIG. 1, the frame 12 and the body 60 may define wheel wells 20 for the vehicle 10. The wheel wells 20 house the wheels (not numbered) of the vehicle 10. Two wheel wells 20 may be on each side of the vehicle 10, e.g., with one at the front and one at the rear of each side. The wheel wells 20 may have an arch shape. The wheel wells 20 may include an outboard side 22 and an inboard side 24 spaced from the outboard side 22 along the cross-vehicle axis C. The outboard side 22 may be open, and the inboard side 24 may be enclosed.

Figure 2:
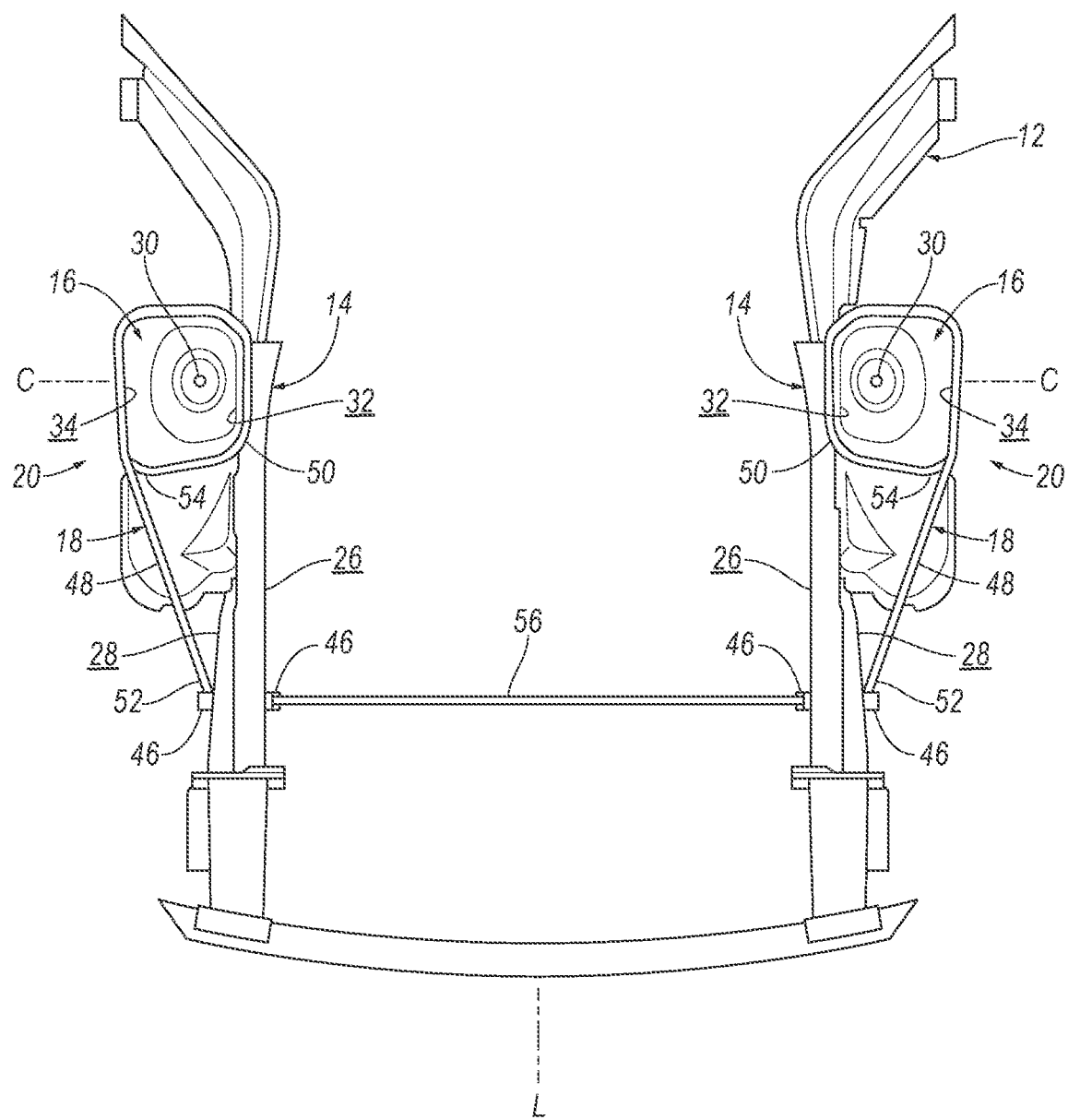
FIG. 2 is a top view of the vehicle frame of FIG. 1.

With reference to FIG. 2, the frame 12 includes two frame rails 14 fixed relative to each other. Each frame rail 14 is elongated along the vehicle-longitudinal axis L. For example, each frame rail 14 may extend from the front of the vehicle 10 to the rear of the vehicle 10. The frame rails 14 are spaced from each other along the cross-vehicle axis C. Each frame rail 14 may include an inboard face 26 and an outboard face 28 spaced from the inboard face 26 along the cross-vehicle axis C. The inboard faces 26 of the frame rails 14 may face each other, and the outboard faces 28 of the frame rails 14 may face away from each other. The frame rails 14 may be metal or any other suitable material.

The frame 12 includes shock tower brackets 16. The shock tower brackets 16 connect the frame 12, e.g., the frame rails 14, to a suspension system (not shown) of the vehicle 10. For example, the shock tower brackets 16 may connect to a dampener and a coil-over spring shock absorber. The shock tower brackets 16 may include an opening 30 to receive one or more components of the suspension system. The opening 30 defines an axis A extending generally parallel to the vertical axis V of the vehicle 10 (see FIG. 1). In this context, "generally" means that the axis A extends upward and downward through the opening 30 even if the axis A deviates slightly from vertical.

The shock tower brackets 16 are fixed relative to the frame rails 14. For example, one or more shock tower brackets 16 may be connected to one frame rail 14, and one or more shock tower brackets 16 may be connected to the other frame rail 14. The shock tower brackets 16 may be connected directly to the respective frame rail 14, e.g., via fastener, welding, etc. As another example, the shock tower brackets 16 may be indirectly connected to the respective frame rail 14, e.g., via one or more intermediate components. The shock tower brackets 16 may be metal or any other suitable material.

In the example shown in the Figures, the frame 12 includes two shock tower brackets 16 aligned with each other along the vehicle-longitudinal axis L. One of the shock tower brackets 16 is connected to one frame rail 14, and the other shock tower bracket 16 is connected to the other frame rail 14. Each shock tower bracket 16 is disposed outboard of the respective frame rail 14 along the cross-vehicle axis C. In other words, the outboard face 28 of each frame rail 14 faces the respective shock tower bracket 16. That is, the frame rails 14 are disposed between the shock tower brackets 16. Additionally, each shock tower bracket 16 extends upwardly along the vertical axis V relative to the respective frame rail 14. In other words, each shock tower bracket 16 is disposed between the respective frame rail 14 and the top of the vehicle 10.

With continued reference to FIG. 2, each shock tower bracket 16 includes an inboard face 32 and an outboard face 34 spaced from the inboard face 32 along the cross-vehicle axis C. The inboard faces 32 of the shock tower brackets 16 face each other, and the outboard faces 34 of the shock tower brackets 16 face away from each other. In other words, the inboard face 32 of each shock tower bracket 16 faces the respective frame rail 14, e.g., the outboard face 28 of the respective frame rail 14.

Each shock tower bracket 16 may partially define one respective wheel well 20. For example, the shock tower bracket 16 may be a portion of the inboard side 24 of the respective wheel well 20. Additionally, the shock tower bracket 16 may extend from the inboard side 24 towards the outboard side 22, e.g., at a top (not numbered), of the respective wheel well 20. That is, the shock tower bracket 16 may partially cover the wheel in the respective wheel well 20. The frame rails 14 are disposed inboard of the wheel wells 20.

With continued reference to FIG. 2, the frame 12 may include one or more brackets 46 supported by each frame rail 14. The bracket(s) 46 may be disposed vehicle-forward of the wheel wells 20. That is, the bracket(s) 46 may be disposed between the wheel wells 20 and the front of the vehicle 10. The brackets 46 may include a feature for threadedly engaging the cable 18, e.g., a weld nut. Each bracket 46 may, for example, be fixed to one frame rail 14, e.g., via fasteners, welding, etc. As another example, the bracket(s) 46 and the respective frame rail 14 may be monolithic. For the purposes of this disclosure, "monolithic" means a single-piece unit, i.e., a continuous piece of material without any fasteners, joints, welding, adhesives, etc., fixing multiple pieces to each other.

The frame 12 may include any suitable number of brackets 46 disposed on each frame rail 14. For example, the frame 12 may include one bracket 46 disposed on each frame rail 14. In such an example, the brackets 46 may be disposed on the outboard face 28 of the respective frame rail 14, or the brackets 46 may be disposed on the inboard face 26 of the respective frame rail 14. When the bracket 46 is disposed on the inboard face 26 of the respective frame rail 14, the cable 18 may extend along the cross-vehicle axis C through the respective frame rail 14, i.e., through the inboard and outboard faces 26, 28 of the respective frame rail 14.

Alternatively, the frame 12 may include two brackets 46 disposed on each frame rail 14. In such an example, one bracket 46 may be engaged with the cable 18 and the other bracket 46 may be engaged with a second cable 56 (as described below). The bracket 46 engaged with the cable 18 may be referred to as the first bracket 46, and the bracket 46 engaged with a second cable 56 may be referred to as the second bracket 46.

The two brackets 46 disposed on the respective frame rail 14 may, for example, be spaced from each other along the cross-vehicle axis C. In other words, one bracket 46 may be disposed on the outboard face 28 of the respective frame rail 14 and the other bracket 46 may be disposed on the inboard face 26 of the respective frame rail 14, as shown in FIG. 2. In such an example, the first and second brackets 46 of the respective frame rail 14 may, for example, be aligned with each other along the vehicle-longitudinal axis L (see FIG. 2). Alternatively, the first and second brackets 46 of the respective frame rail 14 may be spaced from each other along the vehicle-longitudinal axis L.

As another example, the two brackets 46 disposed on the respective frame rail 14 may be disposed on the same face of the respective frame rail 14. For example, the two brackets 46 may each be disposed on the inboard face 26 or the outboard face 28 of the respective frame rail 14. When the first brackets 46 are disposed on the inboard face 26 of the respective frame rail 14, the cable 18 extends from the first bracket 46 through the respective frame rail 14, i.e., through the inboard and outboard faces 26, 28. When the second brackets 46 are disposed on the outboard face 28 of the respective frame rail 14, the second cable 56 extends from the second bracket 46 through the respective frame rail 14, i.e., through the inboard and outboard faces 26, 28. In such examples, the first and second brackets 46 are spaced from each other along the vehicle-longitudinal axis L. In any event, the second brackets 46 are aligned with each other along the vehicle-longitudinal axis L.

Figure 3:
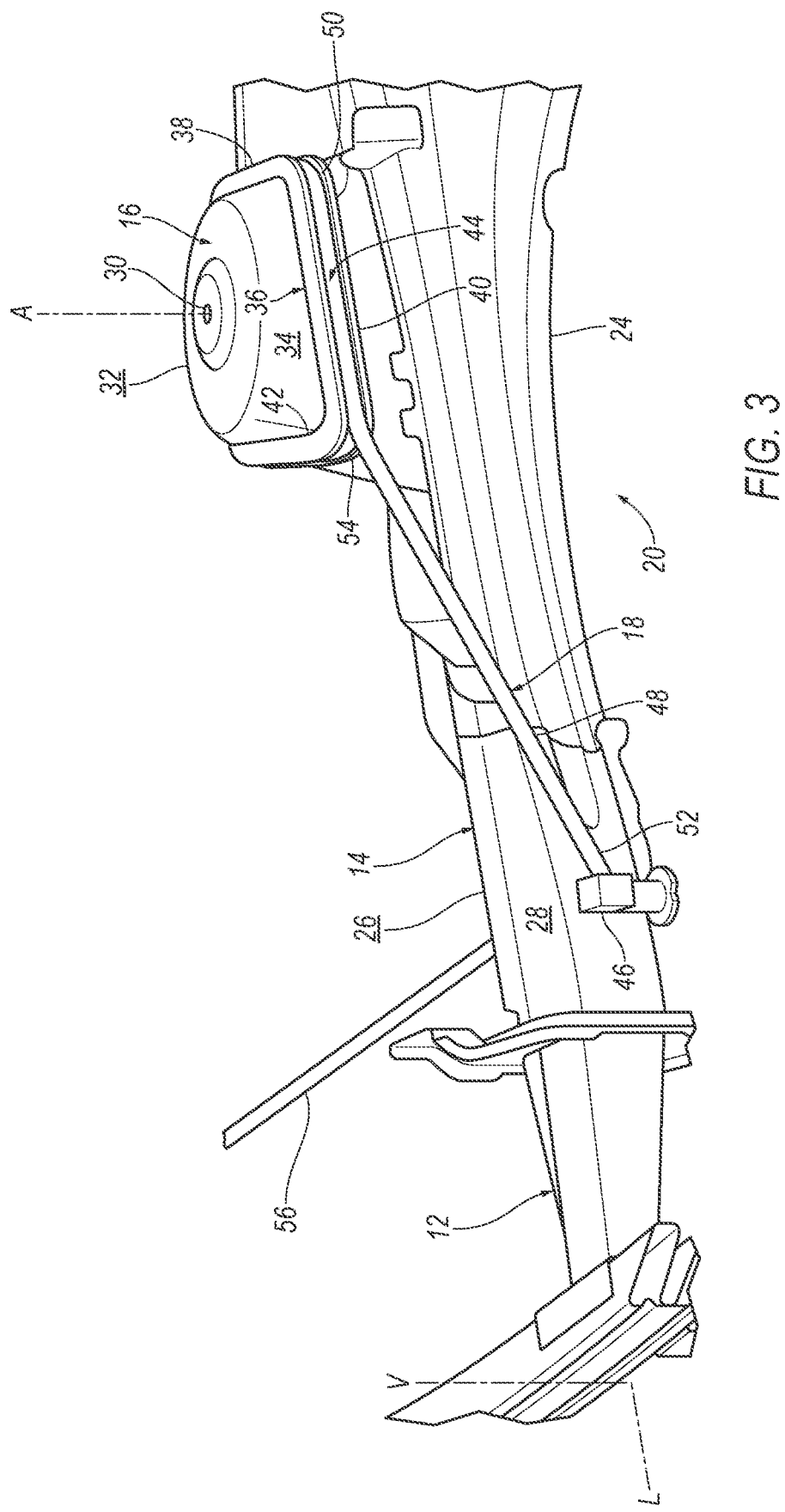
FIG. 3 is a magnified view of the cable and the shock tower bracket include a channel bracket.

With reference to FIG. 3, the frame 12 may include a channel bracket 36 attached to each shock tower 16, e.g., via fasteners, welding, etc. The channel bracket 36 may extend at least partially circumferentially around the respective shock tower bracket 16, e.g., about the axis A. For example, the channel bracket 36 may extend endlessly around the respective shock tower bracket 16. As another example, the channel bracket 36 may extend along the outboard face 34 of the shock tower bracket 16 about the axis A. In such an example, the channel bracket 36 may include one end (not shown) disposed on the outboard face 34 of the shock tower bracket 16 and another end (not shown) spaced from the one end circumferentially along the shock tower bracket 16. The other end may be disposed at any suitable position along the shock tower bracket 16, e.g., on the outboard face 34, on the inboard face 32, etc. That is, the ends of the channel bracket 36 may be circumferentially spaced from each other by any suitable amount about the axis A.

With continued reference to FIG. 3, the channel bracket 36 may include an upper wall 38, a lower wall 40 spaced from the upper wall 38 along the axis A, and an inner wall 42 extending from the upper wall 38 to the lower wall 40. That is, the channel bracket 36 may have a C-shape in cross-section along the axis A. The inner wall 42 may be fixed to the shock tower bracket 16, e.g., via fasteners, welding, etc. The upper wall 38, the lower wall 40, and the inner wall 42 may define a groove 44 therebetween. The groove 44 may be sized to receive the cable 18. That is, the upper wall 38 and the lower wall 40 may be spaced from each other along the axis A by a distance greater than a diameter of the cable 18. The upper wall 38 and the lower wall 40 each may extend any suitable amount radially outward from the inner wall 42. The upper wall 38 and the lower wall 40 may extend a same or different amount radially outward from the inner wall 42.

The cable 18 may, for example, include several strands of wire that are bonded, twisted, and/or braided together into the shape of a helix. The cable 18 may be designed to have a high tensile strength for transferring heavy loads between one frame rail 14 and the respective shock tower bracket 16. The cable 18 may be made of any suitable material such as steel, etc.

Returning to FIG. 2, the vehicle 10 may include one cable 18 extending from each frame rail 14 to the shock tower bracket 16 disposed outboard of the respective frame rail 14. Each cable 18 is fixed relative to the respective frame rail 14 and the respective shock tower bracket 16, as discussed further below. Each cable 18 may extend from any suitable position on the respective frame rail 14 to any suitable position on the respective shock tower bracket 16. For example, each cable 18 may extend from the outboard face 28 of the respective frame rail 14 to the outboard face 34 of the respective shock tower bracket 16. Specifically, each cable 18 extends in front of the wheel in the respective wheel well 20.

With continued reference to FIG. 2, each cable 18 includes a first portion 48 and a second portion 50 extending from the first portion 48. The first portion 48 extends transverse to the vehicle-longitudinal axis L from the respective frame rail 14 to the second portion 50, and the second portion 50 extends along the outboard face 34 of the respective shock tower bracket 16. In other words, the first portion 48 extends from the respective frame rail 14 to the respective shock tower bracket 16. Additionally, the first portion 48 extends to the second portion 50 both transverse to the cross-vehicle axis C and transverse to the vertical axis V (as shown in FIGS. 1 and 3). That is, the first portion 48 extends upwardly, outwardly, and rearwardly from the frame rail 14 to the second portion 50, i.e., the respective shock tower bracket 16.

The first portion 48 includes an end 52 fixed to the frame rail 14. For example, the end 52 may be fixed to one bracket 46. As one example, the end 52 may be threaded and may threadedly engage the bracket 46, e.g., via a weld nut. Alternatively, the end 52 may be fixed directly to the frame rail 14 via fasteners, welding, etc.

The end 52 may be disposed on the outboard face 28 of the frame rail 14, e.g., when the bracket 46 is disposed on the outboard face 28 of the frame rail 14, as shown in FIG. 2. As another example, the end 52 may extend through the frame rail 14 along the cross-vehicle axis C, i.e., through the inboard face 26 and the outboard face 28 of the frame rail 14, e.g., when the bracket 46 is disposed on the inboard face 26 of the frame rail 14. The cable 18 extends vehicle-forward of the wheel well 20 at the frame rail 14. In other words, the end 52 is disposed vehicle-forward of the wheel well 20. That is, the end 52 is between the wheel well 20 and the front of the vehicle 10. Additionally, the end 52 is inboard of the wheel well 20 at the frame rail 14.

The second portion 50 includes an end 54. The end 54 of the second portion 50 is disposed on the shock tower bracket 16. That is, the end 54 of the second portion 50 is above the wheel well 20 defined by the shock tower bracket 16 (as shown in FIG. 1). Additionally, the end 54 of the second portion 50 is outboard of the frame rail 14 to which the shock tower bracket 16 is connected (as shown in FIG. 2). The end 54 of the second portion 50 may be between the outboard side 22 and inboard side 24 of the respective wheel well 20.

The second portion 50 may extend at least partially circumferentially around the shock tower bracket 16, e.g., about the axis A. For example, the second portion 50 may extend entirely circumferentially around the shock tower bracket 16 such that the end 54 of the second portion 50 abuts the first portion 48 of the cable 18, as shown in the Figures. In other words, the second portion 50 may extend in a loop around the shock tower bracket 16. In such an example, the end 54 of the second portion 50 may be fixed, e.g., via welding, fasteners, etc., to the first portion 48 of the cable 18. As another example, the second portion 50 may extend partially circumferentially around the shock tower bracket 16 such that the end 54 of the second portion 50 is spaced from the first portion 48. When the frame 12 includes the channel bracket 36, the second portion 50 may extend through the channel bracket 36, as shown in FIG. 3. That is, the second portion 50 may extend a same amount circumferentially around the shock tower bracket 16 as the channel bracket 36.

The cable 18 is fixed to the shock tower bracket 16 along the second portion 50. The second portion 50 may, for example, be fixed directly to the shock tower bracket 16, e.g., via fasteners, welding, etc., as shown in FIGS. 1 and 2. Alternatively, when the frame 12 includes the channel bracket 36, the second portion 50 may be disposed in the channel bracket 36 and fixed to the channel bracket 36, e.g., via fasteners, welding, etc., as shown in FIG. 3.

The cable 18 is under tension between the frame rail 14 and the shock tower bracket 16. In other words, the cable 18 is taught with tensile force between the frame rail 14 and the shock tower bracket 16. After the second portion 50 is attached to the shock tower bracket 16, the end 52 of the first portion 48 may be fixed to the bracket 46, e.g., via the weld nut, to tension the cable 18. During a SORB frontal crash test, the rigid barrier 58 may impact the cable 18, as shown in FIG. 4A. By tensioning the cable 18, the cable 18 may direct the rigid barrier 58 away from a passenger cabin of the vehicle 10 during the SORB frontal crash test, as shown in FIG. 4B. That is, the cable 18 may distribute a force from the rigid barrier 58 to the frame rail 14 and the shock tower bracket 16, which may guide the rigid barrier 58 transverse to the vehicle-longitudinal axis L away from the passenger cabin of the vehicle 10.

Returning to FIG. 2, the frame 12 may include a second cable 56. The second cable 56 may extend from one frame rail 14 to the other frame rail 14, e.g., along the cross-vehicle axis C. For example, the second cable 56 may extend from the inboard face 26 of one frame rail 14 to the inboard face 26 of the other frame rail 14. The second cable 56 may be attached to each frame rail 14. For example, the second cable 56 may include two threaded ends each threadedly engaged with one second bracket 46, e.g., via a weld nut, on the respective frame rail 14. As another example, each end of the second cable 56 may be directly attached to the respective frame rail 14, e.g., via fasteners, welding, etc.

The second cable 56 is under tension between the one frame rail 14 and the other frame rail 14. In other words, the cable 18 is taught with tensile force between the frame rails 14. During a SORB frontal crash test, the rigid barrier 58 may impact the cable 18, as set forth above (see FIG. 4A). By tensioning the second cable 56, the second cable 56 may distribute the force distributed to one frame rail 14 via the cable 18 to the other frame rail 14 during the SORB frontal crash test, which can assist in maintaining tension in the cable 18, as shown in FIG. 4B.

The second cable 56 may have a same or different construction as the cable 18. For example, the second cable 56 may include several strands of wire that are bonded, twisted, and/or braided together into the shape of a helix. The second cable 56 may be designed to have a high tensile strength for transferring heavy loads between one frame rail 14 and the other frame rail 14. The second cable 56 may be made of any suitable material such as steel, etc.

During a vehicle impact, such as a SORB frontal crash test, the rigid barrier 58 impacts the cable 18. Since the cable 18 is under tension prior to the impact, the cable 18 distributes a force from the impact to the frame rail 14 and the shock tower bracket 16. Specifically, the cable 18 remains attached to the frame rail 14 and the shock tower bracket 16 during the vehicle impact. The tension of the cable 18 results in the force of the rigid barrier 58 of the SORB frontal test being directed away from the passenger cabin to reduce the likelihood that the wheel intrudes inwardly into the passenger cabin of the vehicle 10. In other words, the tension of the cable 18 directs a force path outwardly relative to the vehicle 10 so that the force applied by the rigid barrier 58 is directed away from the passenger cabin.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle frame comprising:
   a frame rail elongated along a vehicle-longitudinal axis;
   a shock tower bracket connected to the frame rail; and
   a cable connected to the frame rail and the shock tower bracket, the cable extending transverse to the vehicle-longitudinal axis from the frame rail to the shock tower bracket;
   the frame rail includes an outboard face facing the shock tower bracket and an inboard face spaced from the outboard face along a cross-vehicle axis, the cable extends from the outboard face of the frame rail to the shock tower bracket.

2. The vehicle frame of claim 1, wherein the cable is fixed relative to the frame rail and the shock tower bracket.

3. The vehicle frame of claim 1, wherein the shock tower bracket partially defines a wheel well and the cable is vehicle-forward and inboard of the wheel well at the frame rail.

4. The vehicle frame of claim 3, wherein the wheel well includes an inboard side and an outboard side spaced from the inboard side of the wheel well along a cross-vehicle axis, the cable is above the wheel well and between the inboard side of the wheel well and the outboard side of the wheel well at the shock tower bracket.

5. The vehicle frame of claim 1, wherein the shock tower bracket is disposed outboard of the frame rail along a cross-vehicle axis and extends upwardly along a vertical axis relative to the frame rail.

6. The vehicle frame of claim 5, the cable extends transverse to the cross-vehicle axis and the vertical axis.

7. The vehicle frame of claim 1, wherein the cable extends at least partially circumferentially around the shock tower bracket.

8. The vehicle frame of claim 1, wherein the shock tower bracket includes an inboard face facing the frame rail and an outboard face spaced from the inboard face of the shock tower bracket along a cross-vehicle axis, the cable extends from the frame rail to the outboard face of the shock tower bracket.

9. The vehicle frame of claim 1, wherein the cable extends through the inboard face of the frame rail and the outboard face of the frame rail.

10. The vehicle frame of claim 1, wherein the cable is under tension between the shock tower bracket and the frame rail.

11. The vehicle frame of claim 1, wherein the cable is metal.

12. The vehicle frame of claim 1, further comprising a bracket attached to the frame rail, the cable being threadedly engaged with the bracket.

13. The vehicle frame of claim 1, further comprising a channel bracket fixed to the shock tower bracket, wherein the cable is disposed in the channel bracket.

14. The vehicle frame of claim 13, wherein the channel bracket extends at least partially circumferentially around the shock tower bracket, and the cable extends through the channel bracket.

15. The vehicle frame of claim 1, further comprising a second frame rail spaced from the frame rail along a cross-vehicle axis, and a second cable extending along the cross-vehicle axis from the frame rail to the second rail.

16. A vehicle frame comprising:
a frame rail elongated along a vehicle-longitudinal axis;
a shock tower bracket connected to the frame rail;
a cable connected to the frame rail and the shock tower bracket, the cable extending transverse to the vehicle-longitudinal axis from the frame rail to the shock tower bracket; and
a bracket attached to the frame rail, the cable being threadedly engaged with the bracket.

17. The vehicle frame of claim 16, wherein the second cable is under tension between the frame rail and the second frame rail.

18. The vehicle frame of claim 16, wherein the frame rail includes an outboard face facing the shock tower bracket and an inboard face spaced from the outboard face along a cross-vehicle axis, the cable is fixed to the outboard face of the frame rail and the second cable is fixed to the inboard face of the frame rail.

19. The vehicle frame of claim 18, further comprising one bracket fixed to the outboard face of the frame rail and another bracket fixed to the inboard face of the frame rail, the cable and the second cable each being threadedly engaged with the respective bracket.

20. The vehicle frame of claim 19, wherein the brackets are aligned with each other along the vehicle-longitudinal axis.

21. A vehicle frame comprising:
a frame rail elongated along a vehicle-longitudinal axis;
a shock tower bracket connected to the frame rail;
a cable connected to the frame rail and the shock tower bracket, the cable extending transverse to the vehicle-longitudinal axis from the frame rail to the shock tower bracket; and
a second frame rail spaced from the frame rail along a cross-vehicle axis, and a second cable extending along the cross-vehicle axis from the frame rail to the second rail.

* * * * *